(12) United States Patent
Tanahashi (10) Patent No.: US 10,903,000 B2
(45) Date of Patent: Jan. 26, 2021

(54) MANUFACTURING METHOD OF REACTOR

(71) Applicant: TOYOTA JIDOSHA KABUSHIKI KAISHA, Toyota (JP)

(72) Inventor: Fumiki Tanahashi, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 269 days.

(21) Appl. No.: 15/928,211

(22) Filed: Mar. 22, 2018

(65) Prior Publication Data

US 2018/0286580 A1 Oct. 4, 2018

(30) Foreign Application Priority Data

Mar. 28, 2017 (JP) ................................ 2017-063768

(51) Int. Cl.
| | | |
|---|---|---|
| *H01F 41/02* | (2006.01) | |
| *B29C 65/48* | (2006.01) | |
| *B29C 65/04* | (2006.01) | |
| *H01F 27/30* | (2006.01) | |
| *H01F 27/26* | (2006.01) | |

(52) U.S. Cl.
CPC ............ *H01F 41/02* (2013.01); *B29C 65/04* (2013.01); *B29C 65/4835* (2013.01); *H01F 27/263* (2013.01); *H01F 27/306* (2013.01); *H01F 41/0206* (2013.01)

(58) Field of Classification Search
CPC ... B29C 65/04; B29C 65/4835; H01F 27/263; H01F 27/306; H01F 41/02; H01F 41/0206
See application file for complete search history.

(56) References Cited

U.S. PATENT DOCUMENTS

| | | | | |
|---|---|---|---|---|
| 8,730,001 | B2 * | 5/2014 | Yoshikawa | ............. H01F 37/00 336/221 |
| 9,570,995 | B2 * | 2/2017 | Inoue | ..................... H01F 7/2847 |
| 2009/0289751 | A1 * | 11/2009 | Nagano | ............... H02M 3/1584 336/221 |
| 2011/0210117 | A1 | 9/2011 | Yonenaga et al. | |
| 2018/0286580 | A1 * | 10/2018 | Tanahashi | ............. H01F 27/306 |

FOREIGN PATENT DOCUMENTS

| | | |
|---|---|---|
| CN | 102016119 A | 4/2011 |
| JP | 8-222461 A | 8/1996 |
| JP | 2007-335523 A | 12/2007 |
| JP | 2013135057 A | 7/2013 |
| JP | 2014-033039 A | 2/2014 |
| RU | 2613331 C2 | 3/2017 |
| WO | 2012150236 A1 | 11/2012 |

* cited by examiner

*Primary Examiner* — Minh N Trinh
(74) *Attorney, Agent, or Firm* — Sughrue Mion, PLLC (57) ABSTRACT

A method of manufacturing a reactor that includes a reactor and a pair of core segments. The method includes mounting the reactor coil onto the pair of core segments, and placing the core segments face to face, with a thermosetting adhesive sandwiched there between. The method further includes placing a heating core such that one end of the heating core around which a heating coil is wound faces one of the core segments, and the other end of the heating core faces the other core segment; producing heat in the core segments by an alternating magnetic flux; and binding together the core segment by a temperature rise and cure of the thermosetting adhesive.

5 Claims, 9 Drawing Sheets

MANUFACTURING METHOD OF REACTOR

INCORPORATION BY REFERENCE

The disclosure of Japanese Patent Application No. 2017-063768 filed on Mar. 28, 2017 including the specification, drawings and abstract is incorporated herein by reference in its entirety.

BACKGROUND

1. Technical Field

A technology to be disclosed by the present specification relates to a reactor manufacturing method and a heating device that is used in manufacturing reactors.

2. Description of Related Art

A reactor of which a core, around which a coil is wound, is divided into a plurality of core segments is known. Such core segments are sometimes bonded together with a thermosetting adhesive. For example, Japanese Patent Application Publication No. 2007-335523 (JP 2007-335523 A) and Japanese Patent Application Publication No. 2014-33039 (JP 2014-33039 A) disclose a technique relating to the bonding of core segments using a thermosetting adhesive. The technique of JP 2007-335523 A involves the following steps: A coil is mounted onto two core segments, and the two core segments are placed face to face, with an uncured thermosetting adhesive sandwiched therebetween. This assembly of the two core segments and the coil is heated with a heater to allow the thermosetting adhesive to undergo a temperature rise and cure. As the thermosetting adhesive cures, the two core segments are bonded together. When the assembly is thus heated with a heater, the coil is heated as well. To distinguish the coil of the reactor from a high-frequency heating coil (to be described later) that heats the reactor, the former will be hereinafter referred to as a reactor coil. The high-frequency heating coil will be referred to simply as a heating coil.

JP 2014-33039 A discloses a technique for bonding together core segments while suppressing the temperature rise of a reactor coil. This technique involves the following steps: A reactor coil is mounted onto two core segments, and the two core segments are placed face to face, with an uncured thermosetting adhesive sandwiched therebetween. This assembly of the two core segments and the reactor coil is disposed inside a heating coil. An alternating current is applied to the heating coil, so that the resulting alternating magnetic flux produces heat in the core segments. The heat produced in the core segments allows the thermosetting adhesive to undergo a temperature rise and cure. As a result, the two core segments are bonded together. In the technique of JP 2014-33039 A, such a frequency is selected that the rate of the temperature rise of the core segments due to the resulting alternating magnetic flux is higher than the rate of the temperature rise of the reactor coil. Therefore, the technique of JP 2014-33039 A can allow the thermosetting adhesive to undergo a temperature rise and cure by the heat produced in the core segments, while suppressing the temperature rise of the reactor coil.

SUMMARY

In the technique of JP 2014-33039 A, the heating coil does not have a core. Therefore, the magnetic field generated by the heating coil spreads to a space surrounding the heating coil. Part of the alternating magnetic flux generated by the heating coil passes through the winding of the reactor coil. This magnetic flux passing through the winding of the reactor coil causes an eddy current and produces heat in the winding. Thus, the technique of JP 2014-33039 A cannot avoid heat being produced in the winding of reactor coil due to the magnetic flux passing therethrough. There is room for improvement in the method of bonding core segments of a reactor using a heating coil (reactor manufacturing method). The present specification provides an improved manufacturing method of a reactor and a heating device suitable for this manufacturing method.

An example aspect of the disclosure is a manufacturing method of a reactor. The reactor includes a first core segment and a second core segment. The manufacturing method includes: mounting a reactor coil onto the first core segment and the second core segment, and placing the first core segment and the second core segment face to face, with an uncured thermosetting adhesive sandwiched between the first core segment and the second core segment; placing a heating core such that one end of the heating core around which a heating coil is wound faces the first core segment, and the other end of the heating core faces the second core segment; producing heat in the first core segment and the second core segment by an alternating magnetic flux, the alternating magnetic flux being generated in a closed magnetic circuit extending through the heating core, the first core segment, the second core segment, and the thermosetting adhesive by applying an alternating current to the heating coil; and binding together the first core segment and the second core segment by a temperature rise and cure of the thermosetting adhesive. According to this manufacturing method, almost the entire magnetic flux generated by the heating coil passes through the closed magnetic circuit extending through the heating core, the first core segment, the second core segment, and the thermosetting adhesive. It is therefore possible to produce heat in the core segments and bond together the core segments while suppressing the temperature rise of the reactor coil.

An area of a bonding interface between the first core segment and the second core segment may be smaller than each of an area of a region of the heating core that faces the first core segment and an area of a region of the heating core that faces the second core segment. The smaller the area through which the magnetic flux passes, the higher the density of the magnetic flux, which means a larger amount of heat produced per unit area. When the regions of the heating core that face the core segments are large, the temperatures of the core segments in the vicinity of the boundary between the heating core and the core segments rise slowly, and meanwhile the temperatures of the core segments in the vicinity of a bonding portion therebetween can be raised quickly.

A frequency of the alternating current may be a frequency such that a loss in the heating core is smaller than a loss in each of the first core segment and the second core segment; and as the alternating current of the frequency flows through the heating coil, the loss of the heating core due to magnetic hysteresis and an eddy current may occur in the first core segment and the second core segment. When an alternating current is applied to the heating coil, a loss (iron loss) due to magnetic hysteresis and an eddy current occurs in the first core segment and the second core segment. The amount of heat produced per unit area of the core is attributable to a loss in the core. The unit area here means a unit area orthogonal to a magnetic flux passing through. The loss in the core depends on the material of the core and the frequency of the current applied. Selecting such a material of the heating core and such a frequency of the alternating current that the loss in the heating core becomes relatively small can reduce the loss in the heating core, so that the magnetic energy can be effectively used to produce heat in the core segments.

One end of the heating core may be disposed adjacent to a bonding portion between the first core segment and the second core segment; and the other end of the heating core may be disposed adjacent to the bonding portion between the first core segment and the second core segment. This configuration can reduce the length of the closed magnetic circuit including the bonding portion (thermosetting adhesive) and increase the amount of heat produced in the vicinity of the bonding portion. As a result, the thermosetting adhesive can be heated more effectively.

A bonding portion between the first core segment and the second core segment may be located inside the reactor coil. When the bonding portion is located inside the reactor coil, a heater cannot heat the bonding portion without also heating the reactor coil. Thus, the temperature of the reactor coil rises. The technique of JP 2014-33039 A cannot avoid heat being produced in the reactor coil as a magnetic flux passes through the winding of the reactor coil and an eddy current occurs. Thus, the temperature of the reactor coil rises. By contrast, the reactor manufacturing method disclosed by the present specification passes a magnetic flux to the bonding portion through the core segments of the reactor, so that most of the magnetic flux does not pass through the winding of the reactor coil. Therefore, the reactor manufacturing method disclosed by the present specification can efficiently heat the bonding portion (thermosetting adhesive), even when it is located inside the reactor coil, while suppressing the temperature rise of the reactor coil.

An example aspect of the disclosure is a heating device that joins together a first core segment and a second core segment of a reactor with a thermosetting adhesive. The first core segment and the second core segment are placed such that the first core segment and the second core segment face each other with the thermosetting adhesive sandwiched between the first core segment and the second core segment. The heating device includes: a heating core having one end of the heating core facing the first core segment and the other end of the heating core facing the second core segment; a heating coil wound around the heating core; and a controller configured to apply an alternating current to the heating coil such that an alternating magnetic flux is generated in a closed magnetic circuit extending through the heating core, the first core segment, the second core segment, and the thermosetting adhesive, when the heating core faces the first core segment and the second core segment.

Details and further improvements of the technique disclosed by the present specification will be described in "Detailed Description of Embodiments" below.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
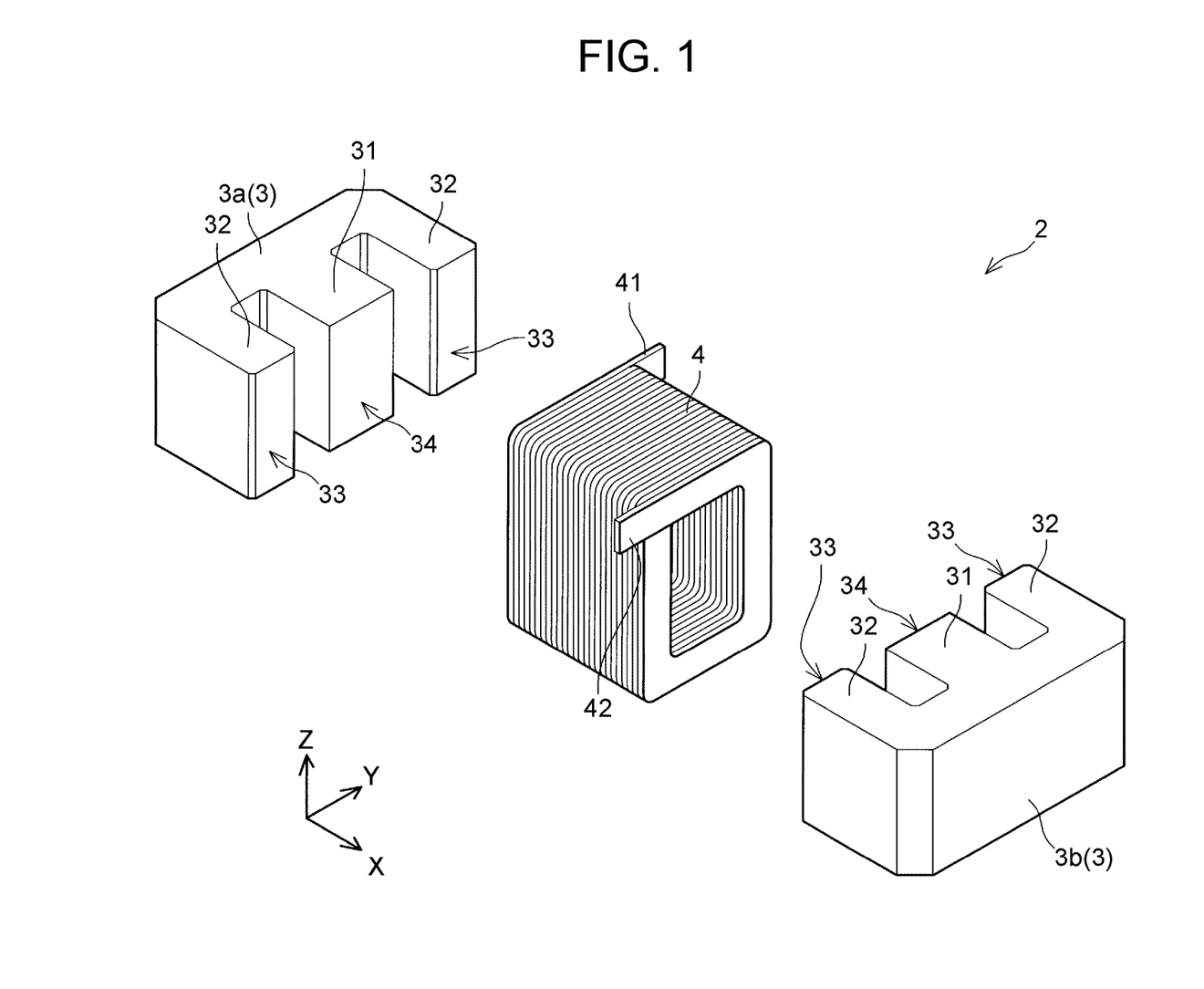
FIG. 1 is an exploded perspective view of a reactor.

A reactor manufacturing method of an embodiment will be described with reference to the drawings. First, a reactor 2 that is one example of the reactor manufactured by the manufacturing method of the embodiment will be described. FIG. 1 is an exploded perspective view of the reactor 2. The reactor 2 includes two E-shaped core segments 3a, 3b, and a coil 4. The core segments 3a, 3b will be collectively referred to as a reactor core 3. The two core segments 3a, 3b have the same shape. The core segments 3a, 3b are disposed so that leading end surfaces 33, 34 of three straight parts 32, 31 extending parallel to one another of one core segment face those of the other core segment, with the central straight parts 31 passed through an inside of the coil 4.

The leading end surfaces 33 of the right and left straight parts 32 of the core segment 3a are bonded with those of the core segment 3b. In other words, the leading end surfaces 33 constitute bonding interfaces between the two core segments 3a, 3b. The leading end surfaces 33 of the right and left straight parts 32 (bonding interfaces) of the two core segments 3a, 3b are bonded together with a thermosetting adhesive, and thus the two core segments 3a, 3b are united into one reactor core 3. Of the three straight parts 32, 31 extending parallel to one another, the central straight part 31 is shorter than the right and left straight parts 32. When the two core segments 3a, 3b are bonded together, a gap is left between the leading end surfaces 34 of the straight parts 31 of the two core segments 3a, 3b. This gap is provided to prevent magnetic saturation of the reactor 2.

The core segments 3a, 3b are produced by compacting a powder of a ferromagnetic material, such as ferrite, with a resin. The coil 4 is an edgewise winding of a rectangular copper wire having an insulating coating. Reference signs 41, 42 denote leader lines of the coil 4. Conventional methods can be adopted for the manufacturing method of the core segments 3a, 3b and the manufacturing method of the coil 4, and therefore detailed description of these manufacturing methods will be omitted.

The core segments 3a, 3b offer the following advantages in manufacturing the reactor 2. The reactor core 3 has a structure in which both ends of the part of the reactor core 3 that is passed through the coil are connected to each other outside the coil. Adopting the core segments 3a, 3b makes it possible to form the coil 4 in advance and then mount the coil 4 onto the core segments 3a, 3b. Adopting such a manufacturing method can reduce the manufacturing cost of the reactor.

Figure 2:
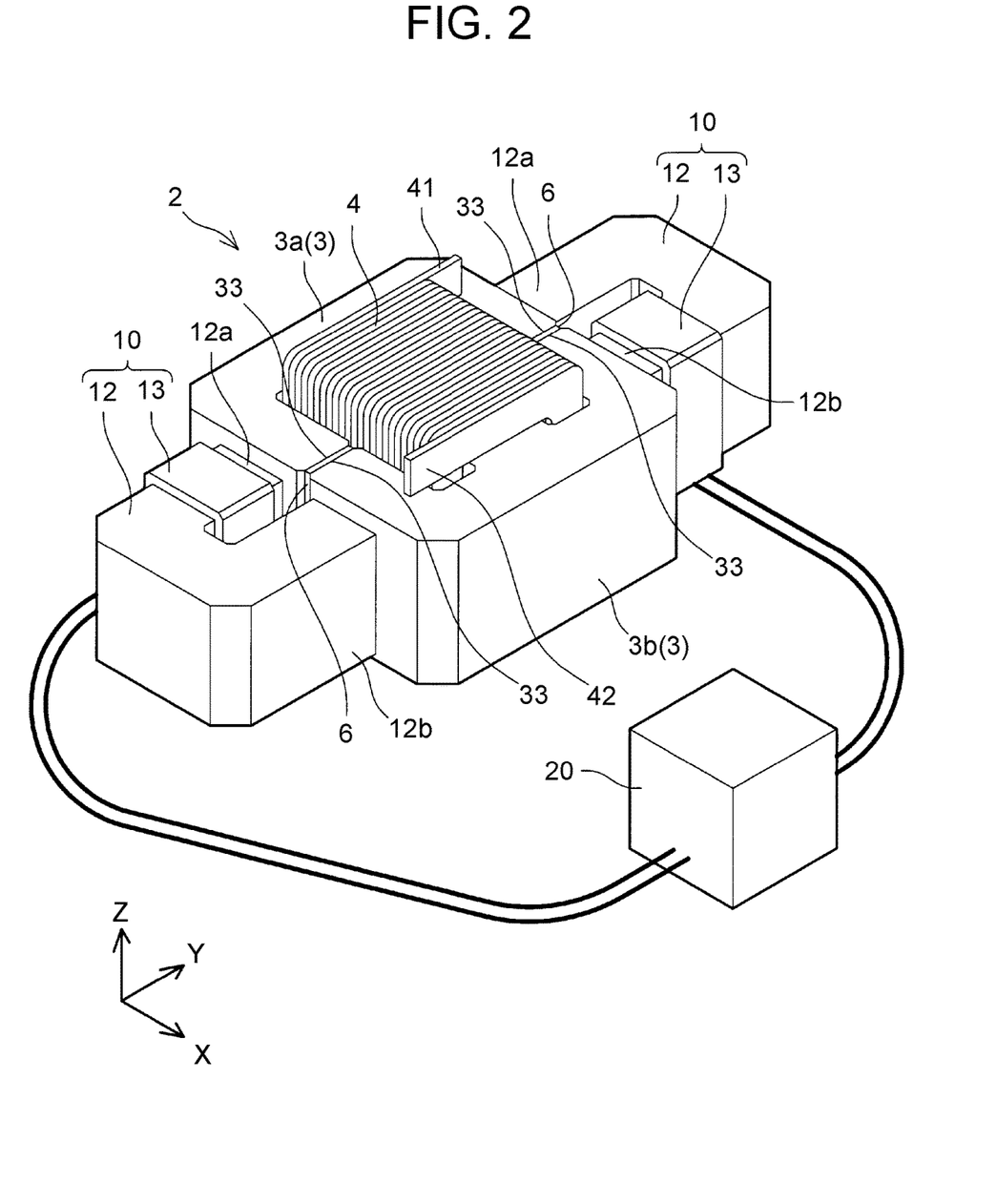
FIG. 2 is a perspective view of the reactor set in a high-frequency heating device.
Figure 3:
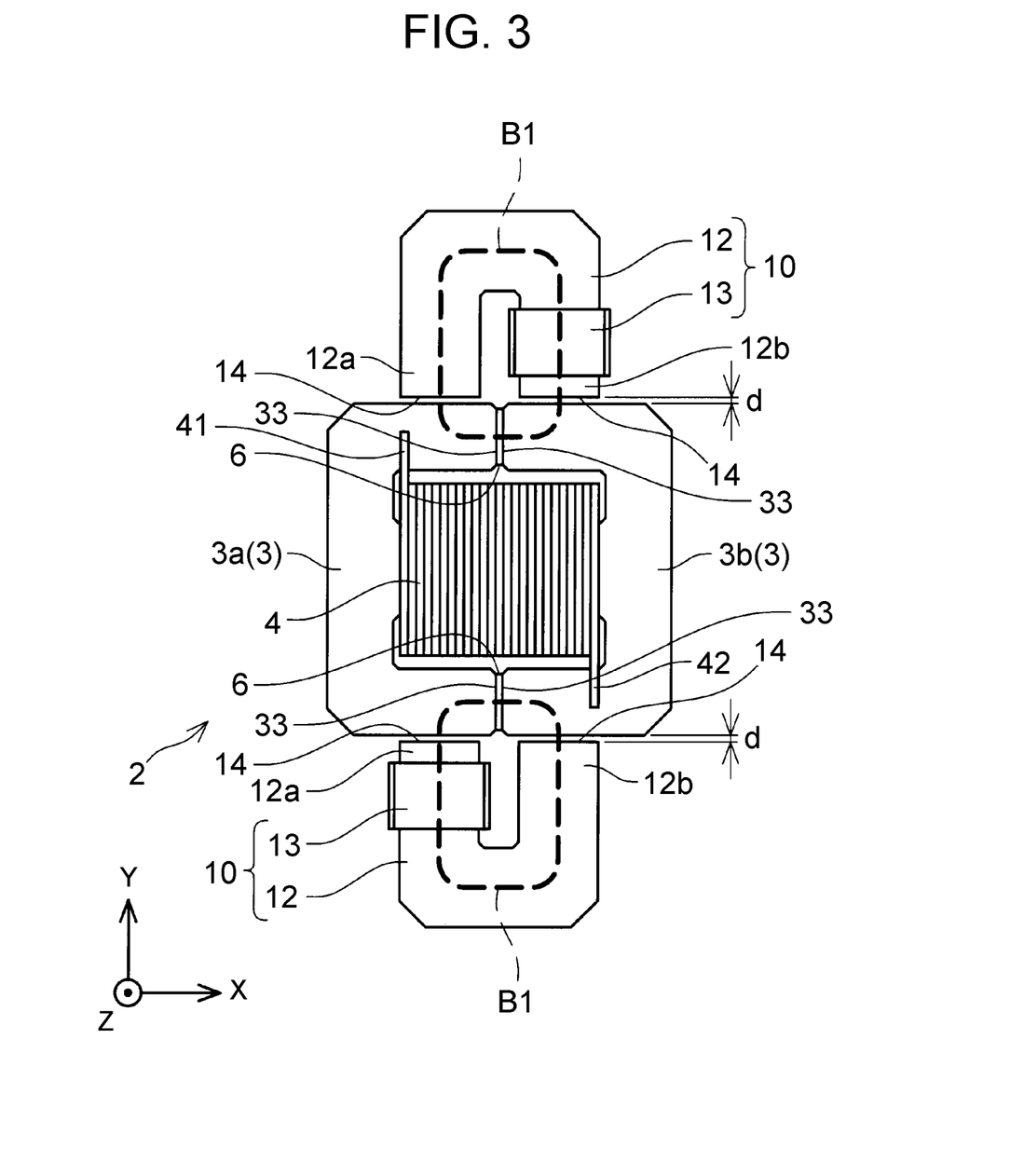
FIG. 3 is a plan view of the reactor set in the high-frequency heating device.

The reactor manufacturing method disclosed by the present specification is characterized by the bonding method of the core segments 3a, 3b. This bonding method of the core segments 3a, 3b will be described. As described above, the core segments 3a, 3b are bonded together with a thermosetting adhesive (thermosetting resin). Before the thermosetting adhesive is cured, the coil 4 is mounted onto the core segments 3a, 3b. Then, the core segments 3a, 3b are disposed closely face to face, with an uncured thermosetting adhesive 6 sandwiched between the leading end surfaces 33 (bonding interfaces). The assembly of the coil 4 and the core segments 3a, 3b (the reactor 2 with the non-bonded core segments) is set in a high-frequency heating device (heating device). FIG. 2 is a perspective view of the assembly set in a high-frequency heating device 10. FIG. 3 is a plan view of the assembly set in the high-frequency heating device 10. A holder that holds the reactor 2 with the non-bonded core segments is not shown in FIG. 2 and FIG. 3.

The high-frequency heating device 10 includes two heating cores 12, heating coils 13 respectively wound around the heating cores 12, and a controller 20. The controller 20 is connected to leader lines of the heating coils 13, and can apply an alternating current to the heating coils 13. A support base for the two heating cores 12 is not shown in FIG. 2 and FIG. 3, either. In FIG. 3, the leader lines of the heating coil 13 and the controller 20 are also not shown.

The heating core 12 has a U-shape, and is disposed so that one end 12a of the U-shape faces the core segment 3a while the other end 12b faces the core segment 3b. The entire leading end surfaces 14 of the heating core 12 face the core segments 3a, 3b.

The leading end surface 14 of the one end 12a of the U-shaped heating core 12 faces the core segment 3a and the leading end surface 14 of the other end 12b faces the core segment 3b, while the leading end surfaces 33 of the core segments 3a, 3b face each other. The leading end surfaces 33 of the core segment 3a and the leading end surfaces 33 of the core segment 3b are parallel to each other, and closely face each other with the thermosetting adhesive 6 sandwiched therebetween. As indicated by the thick dashed lines in FIG. 3, closed magnetic circuits B1 (closed loops) each extending through the heating core 12, the core segments 3a, 3b, and the thermosetting adhesive 6 are formed. In other words, the heating core 12 has a pair of opposed surfaces (the leading end surface 14 of the one end 12a and the leading end surface 14 of the other end 12b) so that, when the heating core 12 faces the core segment 3a and the core segment 3b, the closed magnetic circuit B1 extending through the thermosetting adhesive 6 is formed by the heating core 12 and the core segments 3a, 3b.

When the controller 20 applies an alternating current to the heating coil 13, a magnetic flux (alternating magnetic flux) is generated in the heating core 12, the core segments 3a, 3b, and the thermosetting adhesive 6 along the closed magnetic circuit B1. Since the leading end surfaces 33 of the core segments 3a, 3b closely face each other with the thermosetting adhesive 6 sandwiched therebetween, only a slight amount of magnetic flux leaks through the gap between the leading end surface 33 of the core segment 3a and the leading end surface 33 of the core segment 3b. Almost the entire magnetic flux generated by the heating coil 13 passes through the heating core 12 and the core segments 3a, 3b (and the thermosetting adhesive 6) along the closed magnetic circuit B1, so that the magnetic flux hardly leaks to an outside. The alternating current flowing through the heating coil 13 causes the alternating magnetic flux to flow through the heating core 12 and the core segments 3a, 3b, and this magnetic flux produces heat in the core segments 3a, 3b. This heat is produced as the magnetic energy that the magnetic flux loses while passing through the core changes into heat. The heat produced in the core segments 3a, 3b allows the thermosetting adhesive 6 to undergo a temperature rise and cure. As described above, the magnetic flux generated by the heating coil 13 passes through the heating core 12 and the core segments 3a, 3b (and the thermosetting adhesive 6) and hardly leaks to the outside, so that almost no magnetic flux passes through the coil 4 of the reactor 2. Therefore, the amount of heat produced in the coil 4 is small, and the temperature rise of the coil 4 can be suppressed. In other words, it is possible to cure the thermosetting adhesive 6 by efficiently raising the temperature thereof using the magnetic energy generated by the alternating current in the heating coil 13.

The leading end surfaces 14 of the U-shaped heating core 12 and the reactor core 3 closely face each other across a slight clearance d. The heating core 12 is thus kept out of contact with the reactor core 3 in order to prevent damage to the reactor core 3. The clearance d is slight, and the amount of magnetic flux leaking through the clearance between the leading end surfaces 14 of the heating core 12 and the reactor core 3 is also slight. In other words, the heating core 12 and the reactor core 3 are magnetically coupled to each other.

As shown in FIG. 3, the heating core 12 is disposed so that both ends 12a, 12b are adjacent to the bonding portion between the core segments 3a, 3b (leading end surfaces 33). With the heating core 12 thus disposed, the length of the closed magnetic circuit B1 extending through the core segments 3a, 3b is reduced, so that the temperature of the bonding portion (thermosetting adhesive 6) can be effectively raised.

The alternating magnetic flux, albeit a slight amount, passes through the central straight parts 31 (see FIG. 1) of the core segments 3a, 3b. This means that the alternating magnetic flux passes through the inside of the coil 4. Even when the alternating magnetic flux passes through the inside of the coil 4, no current flows through the coil 4, as both ends 41, 42 of the coil 4 are free. Moreover, no magnetic flux passes through the winding of the coil 4, so that no eddy current occurs in the winding of the coil 4. Therefore, almost no heat is produced in the coil 4.

Figure 4:
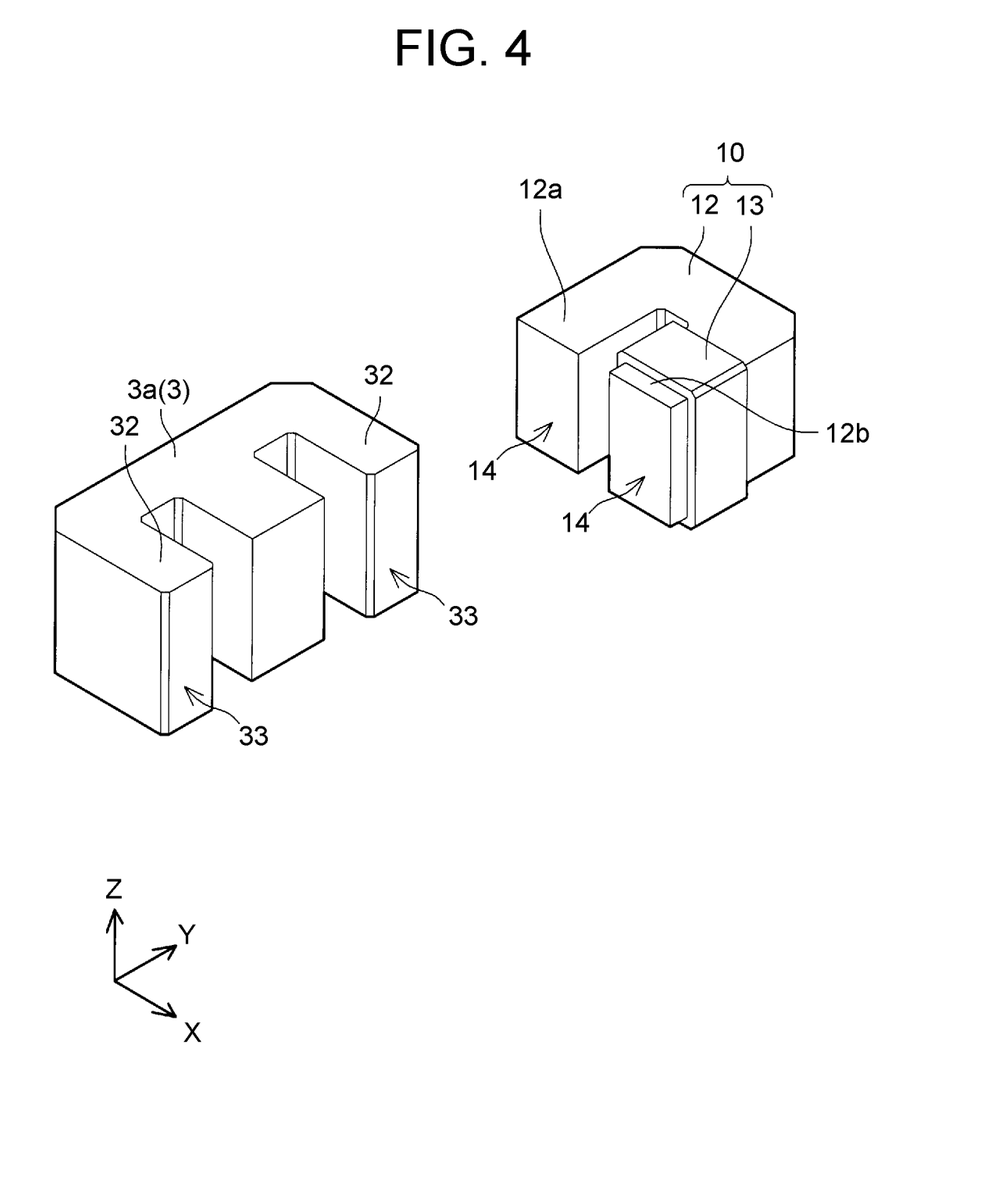
FIG. 4 is a perspective view of one core segment of the reactor and one heating core.

FIG. 4 is a perspective view of one core segment 3a and one heating core 12. The leading end surfaces 14 of the heating core 12 face the core segments 3a, 3b. The area of the leading end surface 33 (bonding interface) of the core segment 3a is smaller than the area of the leading end surface 14 of the heating core 12 (i.e., the area of the region of the heating core 12 that faces the core segment 3a). The core segments 3a, 3b have the same shape, and the area of the leading end surface 33 (bonding interface) of the core segment 3b is also smaller than the area of the leading end surface 14 of the heating core 12 (the area of the region of the heating core 12 that faces the core segment 3b). This means that the density of magnetic flux in the bonding interface is higher than the density of magnetic flux at the boundary between the heating core 12 and the core segment 3a (leading end surface 14). The higher the density of magnetic flux, the larger the amount of heat produced per unit area. Because of this area relationship, the loss of magnetic energy in the vicinity of the boundary between the heating core 12 and the core segment 3a is reduced, and the density of heat production in the vicinity of the bonding portion (thermosetting adhesive 6) relatively increases. This contributes to accelerating the temperature rise of the thermosetting adhesive 6.

Figure 5:
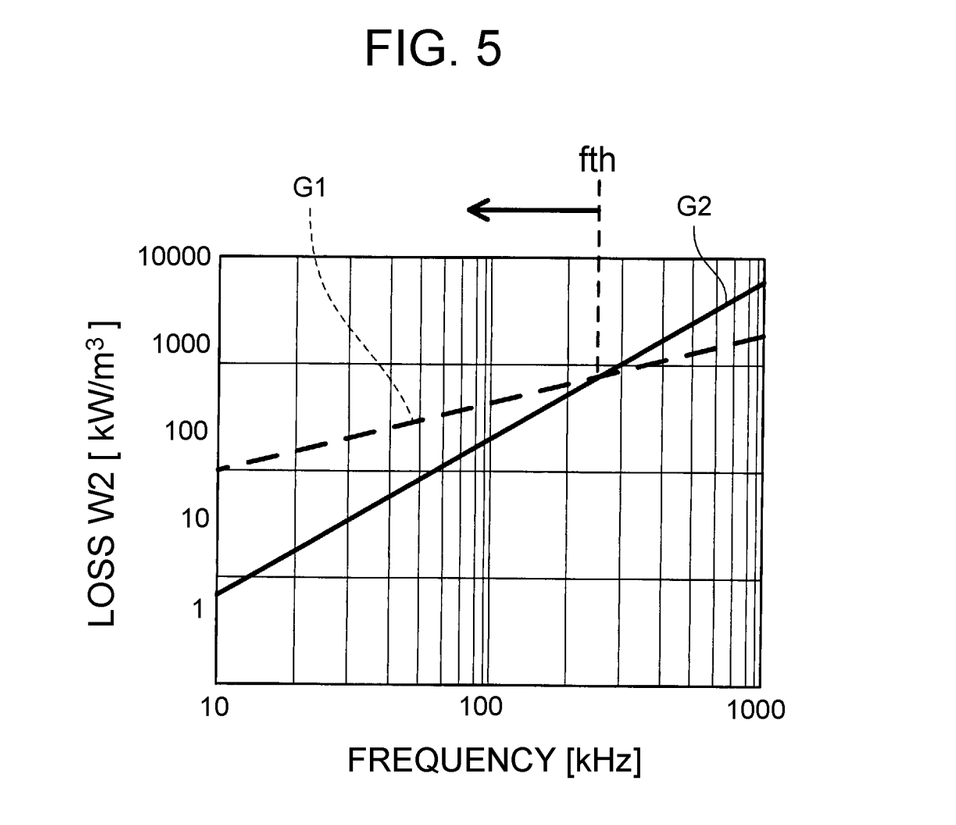
FIG. 5 is a graph showing loss characteristics of the core segment and the heating core.

Next, the frequency of the alternating current applied to the heating coil 13 will be described. FIG. 5 is a graph showing the loss characteristics of the reactor core 3 and the heating core 12. The vertical axis shows a loss W2, and the horizontal axis shows the frequency. The dashed-line graph G1 represents the frequency characteristics of the loss in the reactor core 3, and the solid-line graph G2 represents the frequency characteristics of the loss in the heating core 12. In a range lower than the frequency fth, the loss in the heating core 12 (graph G2) is smaller than the loss in the reactor core 3 (line G1). The frequency of the alternating current applied to the heating coil 13 is set to a range lower than the frequency fth. When such a frequency is selected, the amount of heat produced in the heating core 12 becomes smaller than the amount of heat produced in the reactor core 3. This also contributes to effectively raising the temperature of the bonding portion (thermosetting adhesive 6). As the alternating current is applied to the heating coil 13, a loss (iron loss) due to magnetic hysteresis and an eddy current occurs in the reactor core 3 (core segments 3a, 3b).

Figure 6:
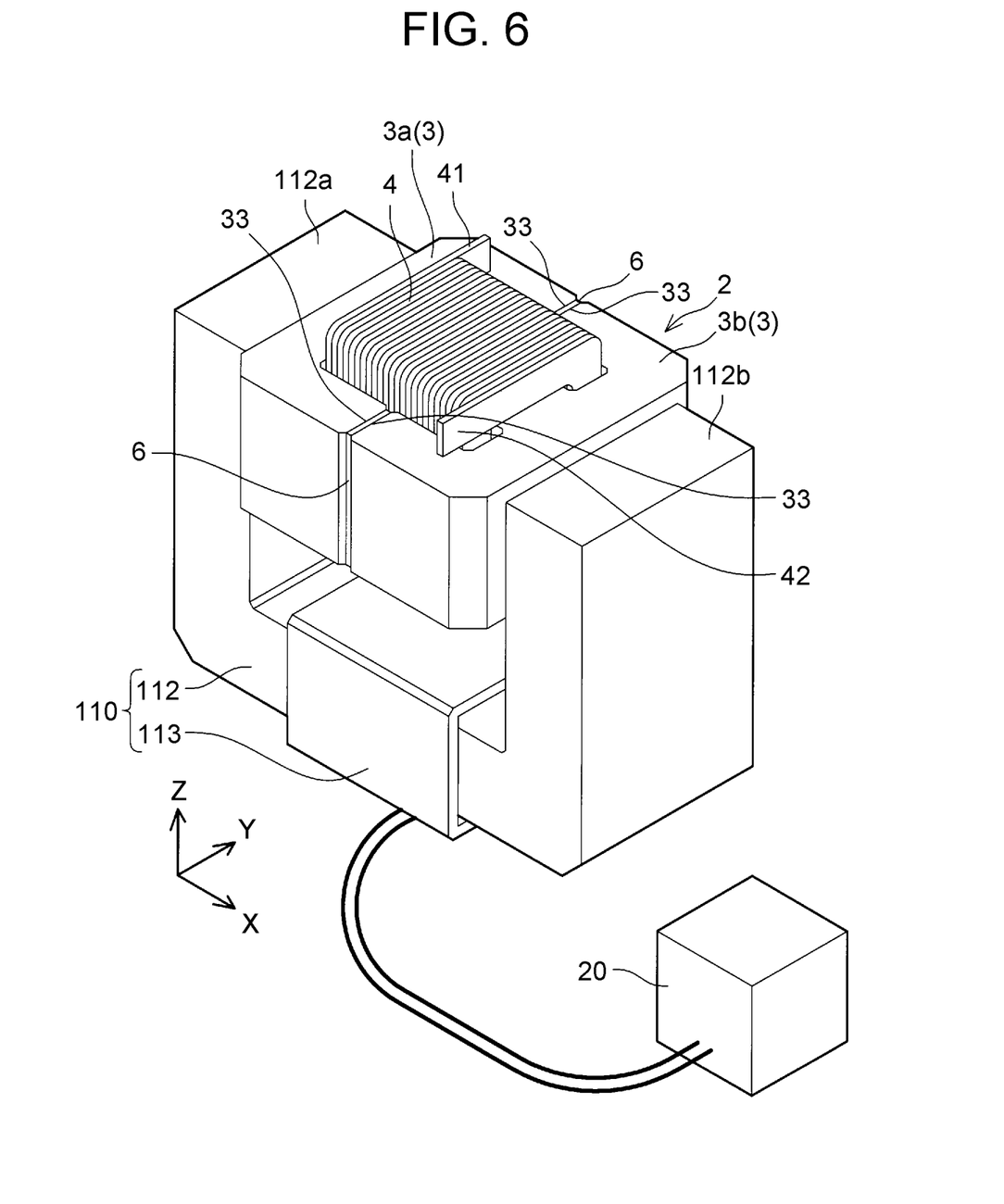
FIG. 6 is a perspective view of the reactor set in another high-frequency heating device.
Figure 7:
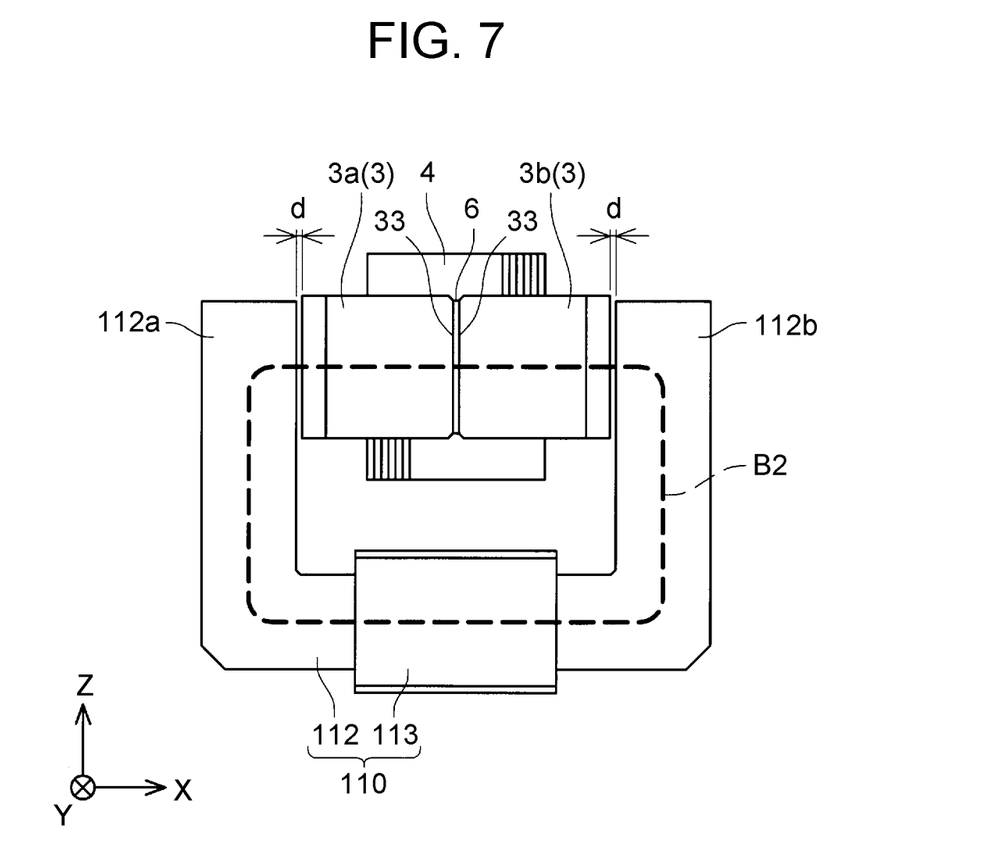
FIG. 7 is a plan view of the reactor set in the same high-frequency heating device.

Another example of the high-frequency heating device will be described using FIG. 6 and FIG. 7. FIG. 6 is a perspective view of another high-frequency heating device 110 in which the reactor 2 with the non-bonded core segments 3a, 3b is set. FIG. 7 is a side view of the high-frequency heating device 110 in which the reactor 2 with the non-bonded core segments 3a, 3b is set. The leader lines of the core segments 3a, 3b, the controller 20, and a part of the winding of the coil 4 are not shown in FIG. 7. The high-frequency heating device 10 shown in FIG. 2 and FIG. 3 includes the two heating cores 12. The high-frequency heating device 110 shown in FIG. 6 includes one large-sized U-shaped heating core 112. The two core segments 3a, 3b closely held together with an uncured thermosetting adhesive sandwiched therebetween is set on an inside of both leading ends 112a, 112b of the U-shaped heating core 112. The holder of the core segments 3a, 3b that are closely held together is not shown in FIG. 6 and FIG. 7.

The one end 112a of the heating core 112 closely faces the core segment 3a, while the other end 112b closely faces the core segment 3b. The core segments 3a, 3b closely face each other with the thermosetting adhesive 6 sandwiched therebetween. As shown in FIG. 7, the core segments 3a, 3b are held on the inside of both ends 112a, 112b of the U-shaped heating core 112, and a closed magnetic circuit B2 is formed by the heating core 112 and the core segments 3a, 3b (and the thermosetting adhesive 6). When the controller 20 applies an alternating current to a heating coil 113, an alternating magnetic flux is generated in the closed magnetic circuit B2. This alternating magnetic flux produces heat in the core segments 3a, 3b, so that the thermosetting adhesive 6 undergoes a temperature rise and cures. As a result, the core segments 3a, 3b are bonded together. Most of the magnetic field (magnetic flux) generated by the heating coil 113 passes through the closed magnetic circuit B2, and therefore the coil 4 of the reactor 2 is hardly heated.

As described above, the central straight parts 31 (see FIG. 1) of the E-shaped core segments 3a, 3b are shorter than the right and left straight parts 32, and a gap is left between the leading end of the straight part 31 of the core segment 3a and the leading end of the straight part 31 of the core segment 3b. The width of the gap is larger than the width of the thermosetting adhesive 6. The magnetic resistance of a magnetic path extending through the central straight parts 31 of the core segments 3a, 3b facing each other is larger than the magnetic resistance of a magnetic path extending through the right and left straight parts 32. Therefore, not so much magnetic flux flows through the magnetic path extending through the central straight parts 31 (i.e., the magnetic path extending through the inside of the coil 4) as through the magnetic path extending through the right and left straight parts 32. Moreover, even when an alternating magnetic flux flows through the inside of the coil 4, no inductive current flows through the coil 4, as both ends 41, 42 of the coil 4 are free. No magnetic flux directly flows through the winding of the coil 4, so that no eddy current occurs in the winding of the coil 4, either. Since the clearance d between the leading ends 112a, 112b of the heating coil 113 and the reactor core 3 is small, only a slight amount of magnetic flux leaks through this clearance. Since the thickness of the thermosetting adhesive 6 is small, only a slight amount of magnetic flux leaks through the gap between the leading end surface 33 of the core segment 3a and the leading end surface 33 of the core segment 3b. These factors also contribute to suppressing the temperature rise of the coil 4.

Figure 8:
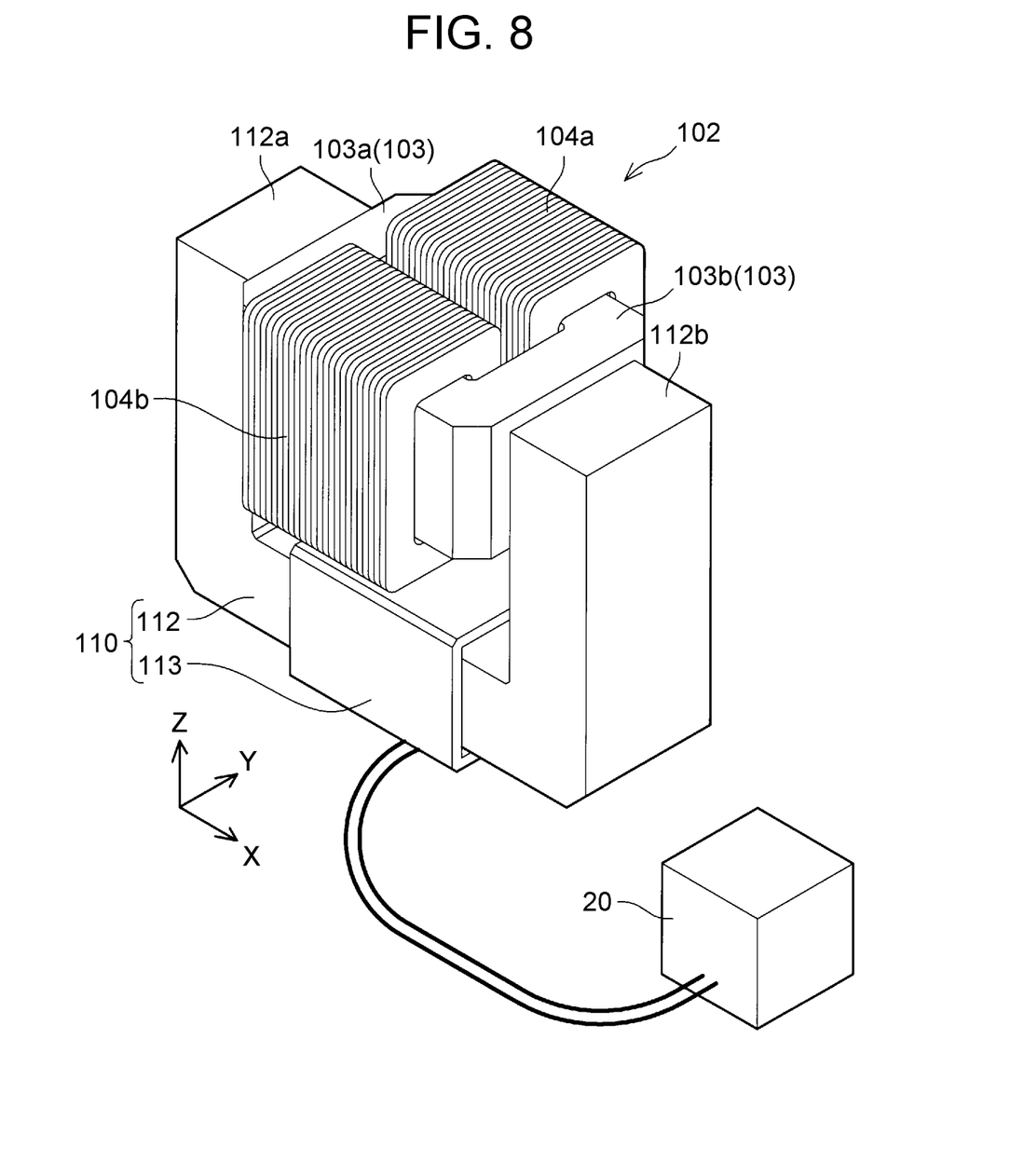
FIG. 8 is a perspective view of a double-coil reactor and the high-frequency heating device.

A manufacturing method of a reactor having a different shape will be described using FIG. 8 and FIG. 9. FIG. 8 is a perspective view of a reactor 102 set in the high-frequency heating device 110. The high-frequency heating device 110 is the same device as that described with FIG. 6 and FIG. 7. Two core segments 103a, 103b that are closely held together with uncured thermosetting adhesives 6a, 6b and a gap plate 7 sandwiched therebetween, are set on the inside of both leading ends of the U-shaped heating core 112. A holder of the core segments 103a, 103b that are closely held together is not shown in FIG. 8 and FIG. 9.

A core (reactor core 103) of the reactor 102 is divided into the two U-shaped core segments 103a, 103b. When joined together, the core segments 103a, 103b form a ring shape. Two coils 104a, 104b are wound around the ring-shaped reactor core 103. The reactor 102 is sometimes called a double-coil reactor. Although leader lines of the coils 104a, 104b are not shown, one end of the coil 104a and one end of the coil 104b are connected to each other.

In the manufacturing method of the reactor 102, first, the coils 104a, 104b are mounted onto the core segments 103a, 103b of the reactor 102, and the core segments 103a, 103b are placed closely face to face, with the uncured thermosetting adhesive sandwiched therebetween. Next, the assembly of the core segments 103a, 103b and the coils 104a, 104b (the assembly with the uncured thermosetting adhesive) is set in the high-frequency heating device 110.

The bonding portions between the core segments 103a, 103b are respectively located on an inside of the coils 104a, 104b. FIG. 9 is a side view of the reactor 102 set in the high-frequency heating device 110. In FIG. 9, the coil 104b is indicated by an imaginary line, and thus the core segments 103a, 103b inside the coil 104b are also depicted.

The core segments 103a, 103b face each other with the gap plate 7 sandwiched therebetween. The leading end surface 133 of the core segment 103a and the gap plate 7 are bonded together with the thermosetting adhesive 6a, while the leading end surface 133 of the core segment 103b and the gap plate 7 are bonded together with the thermosetting adhesive 6b. The leading end surfaces 133 of the core segments 103a, 103b correspond to the bonding interface. The heating core 112 is disposed so that the one end 112a faces the core segment 103a while the other end 112b faces the core segment 103b.

Figure 9:
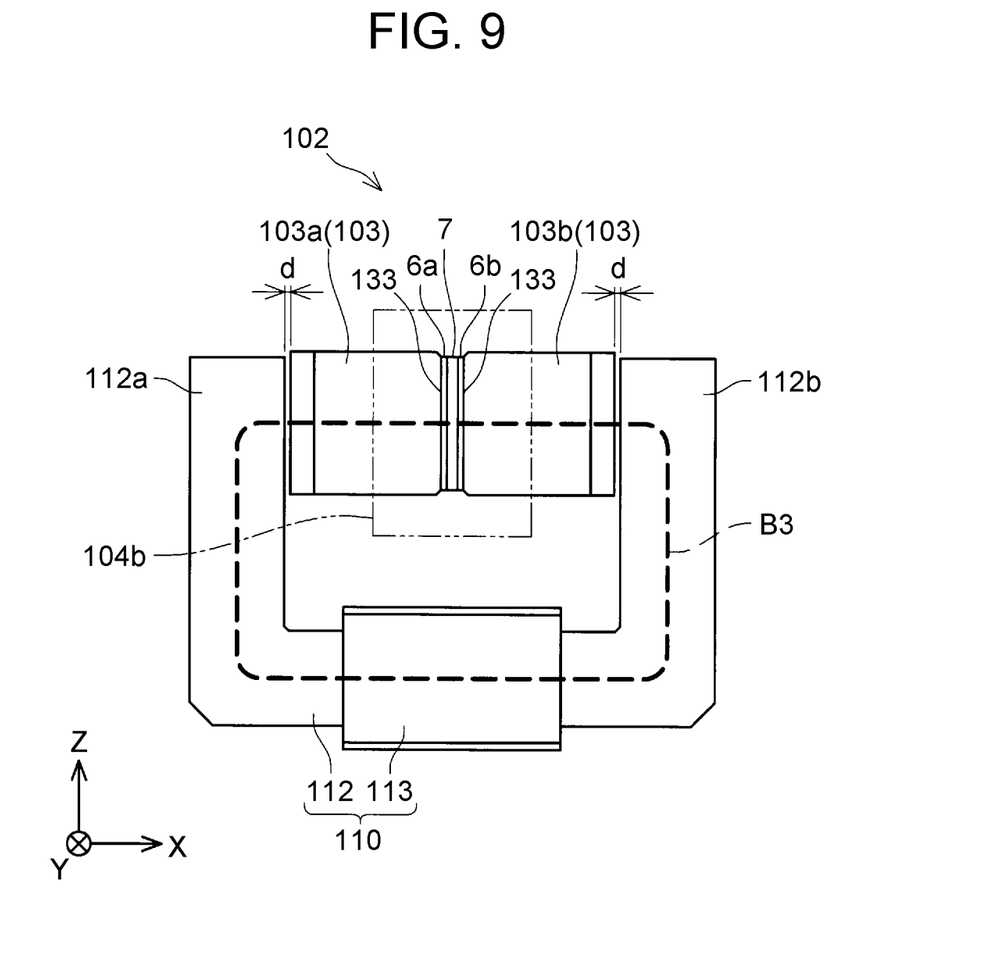
FIG. 9 is a side view of the double-coil reactor and the high-frequency heating device.

As shown in FIG. 9, a closed magnetic circuit B3 is formed by the heating core 112 and the core segments 103a, 103b. When the controller 20 applies an alternating current to the heating coil 113, a loss of magnetic energy in the core segments 103a, 103b changes into heat, and thus heat is produced. This heat allows the thermosetting adhesives 6a, 6b to undergo a temperature rise and cure. As a result, the core segments 103a, 103b are bonded together. Most of the alternating magnetic flux generated by the alternating current flowing through the heating coil 113 flows through the closed magnetic circuit B3. While one end of the coil 104*a* and one end of the coil 104*b* are connected to each other, the other end of the coil 104*a* and the other end of the coil 104*b* are connected to nothing. During the bonding of the core segments 103*a*, 103*b*, the coils 104*a*, 104*b* as an electrical circuit are open. Therefore, even when an alternating magnetic flux passes through the inside of the coils 104*a*, 104*b*, no inductive current flows through the coils 104*a*, 104*b*. Moreover, as in the above embodiment, almost no alternating magnetic flux flows through the windings of the coils 104*a*, 104*b*. Accordingly, almost no heat is produced in the coils 104*a*, 104*b* of the reactor 102.

In the case of a reactor in which the bonding portion between the core segments is located inside the reactor coil, applying heat to the bonding portion by a heater etc. from the outside ends up raising the temperature of the reactor coil as well. The manufacturing method disclosed by the present specification uses the heat produced in the core segments to allow the thermosetting adhesive to undergo a temperature rise and cure. Both ends of the reactor coil are free, so that no inductive current flows through the reactor coil even when an alternating magnetic flux passes through the inside of the reactor coil. Most of the alternating magnetic flux generated by the alternating current in the heating coil passes through the inside of the core segments, and almost no magnetic flux passes through the winding of the reactor coil. Thus, the temperature rise of the reactor coil can be suppressed. The manufacturing method disclosed by the present specification is especially suitable for a reactor in which the bonding position is located inside the coil.

The following are notes on the technique having been described in the embodiment: The core segments 3*a*, 103*a* of the embodiment correspond to one example of the first core segment. The core segments 3*b*, 103*b* of the embodiment correspond to one example of the second core segment. A gap plate or another core segment may be sandwiched between the first core segment and the second core segment. Thus, the technique disclosed by the present specification is also applicable to the manufacture of a reactor having a core that is divided into three or more segments.

The manufacturing method disclosed by the present specification is especially suitable for the manufacture of a reactor including a core of which both ends of a part passed through a coil are connected to each other outside the coil. Such a reactor is easy to manufacture in that a coil manufactured in advance can be installed on segments of the core. On the other hand, applying heat to such a reactor from the outside to raise the temperature of the bonding position ends up raising the temperature of the coil as well. The technique disclosed by the present specification uses the heat produced in the core of the reactor to raise the temperature of the thermosetting adhesive, and therefore can suppress the temperature rise of the coil.

The reactor manufactured by the manufacturing method disclosed by the present specification is not limited to the reactor of the embodiment. Moreover, the manufacturing method disclosed by the present specification is not limited to the configuration of the high-frequency heating devices 10, 110 of the embodiment. In the manufacturing method of the embodiment, the heating cores 12, 112 and the reactor cores 3, 103 are disposed with the clearance d left therebetween. This is to prevent damage to the reactor cores 3, 103. Alternatively, the surface of the heating core facing the reactor core may be physically in contact with the reactor core.

While the specific examples of the present disclosure have been described in detail above, these examples are merely illustrative and not intended to limit the scope of the claims. The technique described in the scope of the claims also includes the above-illustrated specific examples with various modifications and changes added thereto. The technical elements described in the present specification or the drawings exhibit technical utility independently or in various combinations, and are not limited to the combinations described in the claims at the time of patent application. Moreover, the technique illustrated in the present specification or the drawings can achieve a plurality of objects at the same time, and has technical utility simply by achieving one of these objects.

What is claimed is:

1. A manufacturing method of a reactor comprising:
    providing a first core segment and a second core segment;
    mounting a reactor coil onto the first core segment and the second core segment, and placing the first core segment and the second core segment face to face, with a thermosetting adhesive sandwiched between the first core segment and the second core segment;
    placing a heating core such that one end of the heating core around which a heating coil is wound faces the first core segment, and the other end of the heating core faces the second core segment;
    producing heat in the first core segment and the second core segment by an alternating magnetic flux, the alternating magnetic flux being generated in a closed magnetic circuit extending through the heating core, the first core segment, the second core segment, and the thermosetting adhesive by applying an alternating current to the heating coil; and
    binding together the first core segment and the second core segment by a temperature rise and cure of the thermosetting adhesive in response to the heat produced in the first core segment and the second core segment so as to manufacture the reactor including the first core segment, the second core segment and the mounted reactor coil.

2. The manufacturing method according to claim 1, wherein
    an area of a bonding interface between the first core segment and the second core segment is smaller than each of an area of a region of the heating core that faces the first core segment and an area of a region of the heating core that faces the second core segment.

3. The manufacturing method according to claim 1, wherein:
    a frequency of the alternating current is a frequency such that a loss in the heating core is smaller than a loss in each of the first core segment and the second core segment; and
    as the alternating current of the frequency flows through the heating coil, the loss of the heating core due to magnetic hysteresis and an eddy current occurs in the first core segment and the second core segment.

4. The manufacturing method according to claim 1, wherein:
    one end of the heating core is disposed adjacent to a bonding portion between the first core segment and the second core segment; and
    the other end of the heating core is disposed adjacent to the bonding portion between the first core segment and the second core segment.

5. The manufacturing method according to claim 1, wherein
   a bonding portion between the first core segment and the second core segment is located inside the reactor coil.

* * * * *